Patented Dec. 24, 1929

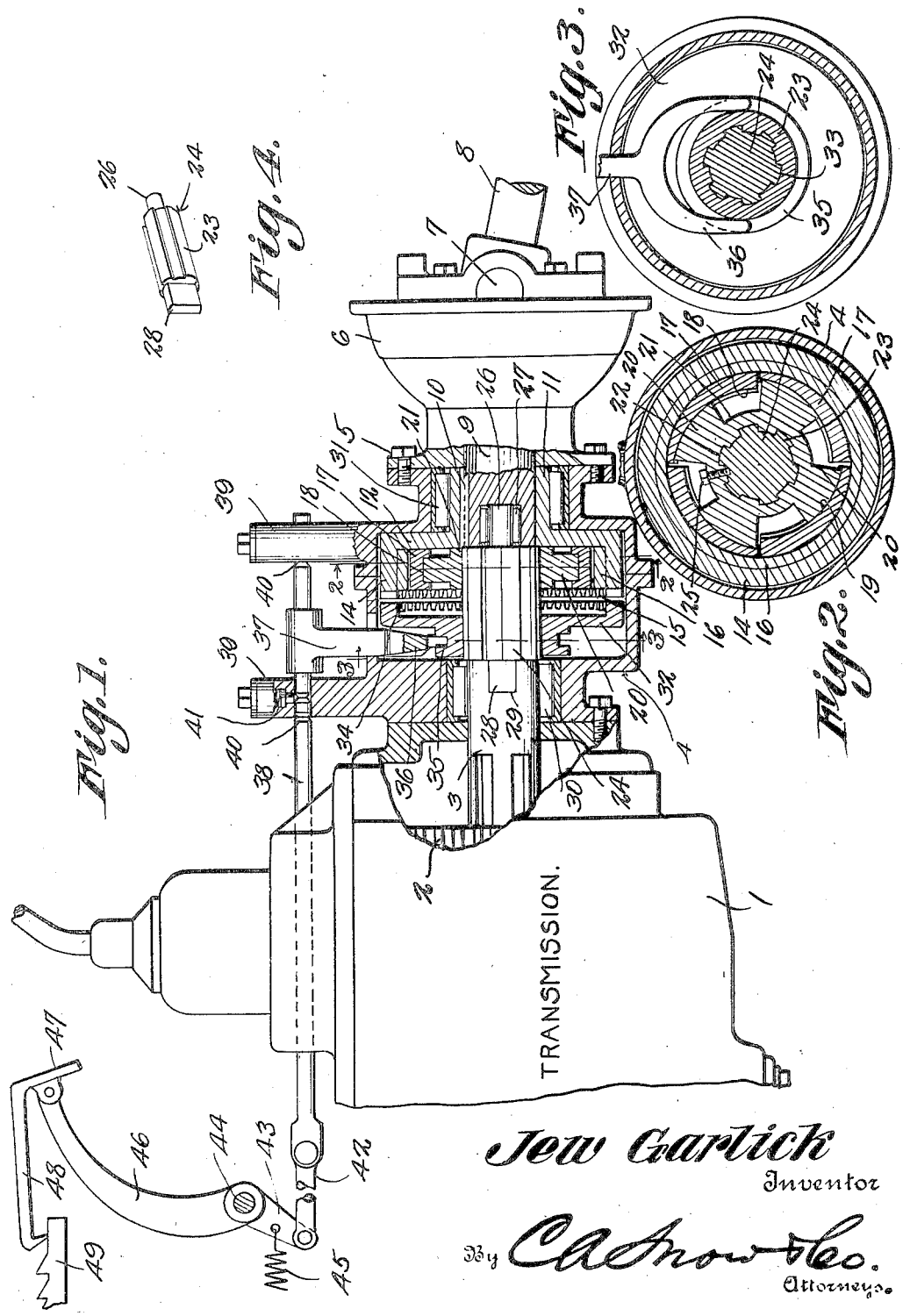

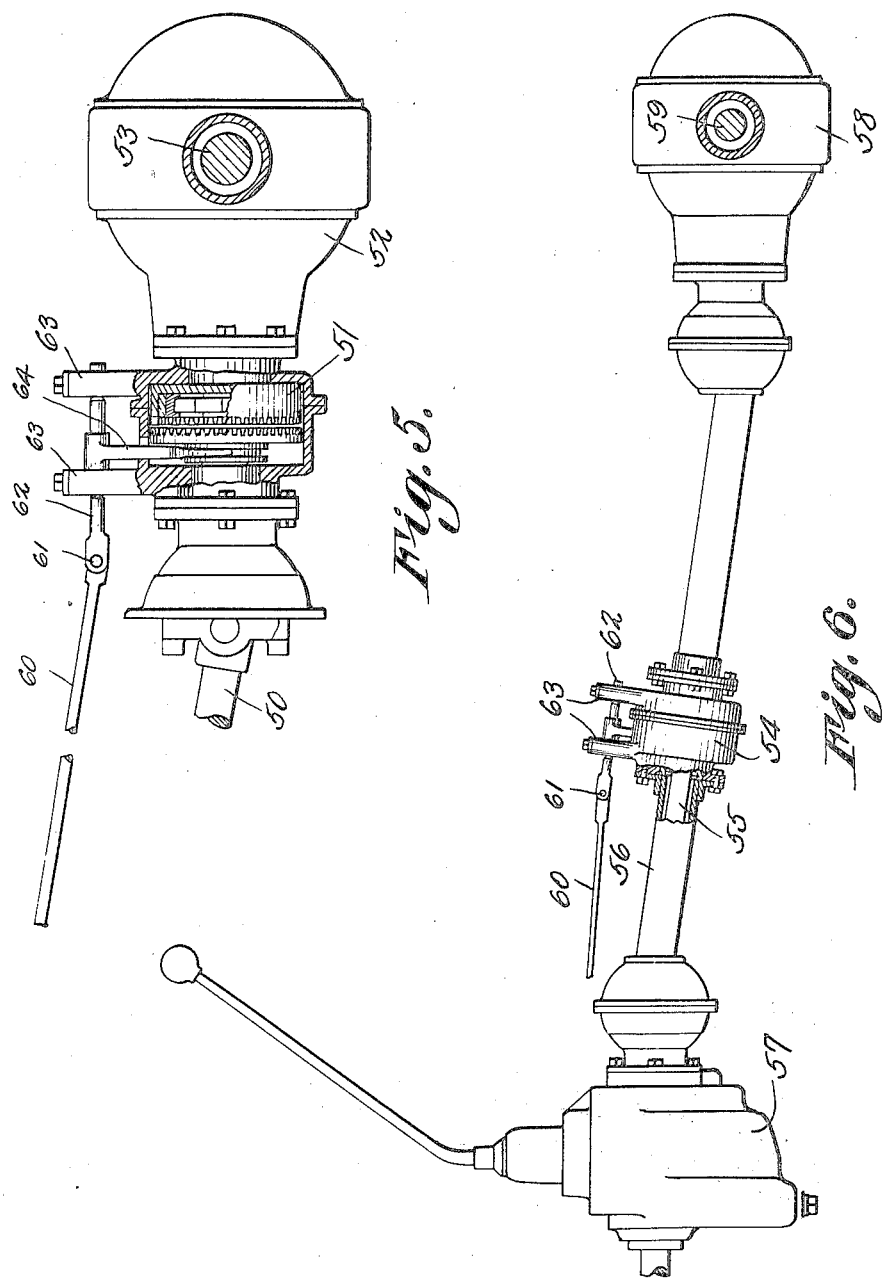

1,740,455

UNITED STATES PATENT OFFICE

JEW GARLICK, OF PATERSON, NEW JERSEY

AUTOMATIC COASTER FOR AUTOS

Application filed December 9, 1926. Serial No. 153,582.

This invention aims to provide novel means whereby, when the mechanism which is connected immediately to the wheels of an automobile, rotates faster than the transmission shaft, said mechanism will be uncoupled automatically from the transmission shaft, thereby permitting the vehicle to coast and to save fuel.

Another object of the invention is to provide means whereby, at the will of an operator, the coasting instrumentality may be rendered inoperative.

Another object of the invention is to locate an over-running clutch in such a way with respect to the wheels of a vehicle, and to the transmission shaft thereof, that the clutch will permit coasting at every speed of the transmission mechanism.

Saving in so far as limited by the claim, I do not bind myself to the exact forms hereinafter described, and shown in the drawings; because a mechanic, working within the scope of what is claimed, may make such changes as his skill may suggest, without in anywise departing from the spirit of the invention.

In the drawings:—

Figure 1 is a side elevation showing a portion of the driving mechanism of an automobile, wherein the invention has been embodied, parts being in section;

Figure 2 is a section on the line 2—2 of Figure 1;

Figure 3 is a cross section on the line 3—3 of Figure 1;

Figure 4 is a perspective view of the jack shaft;

Figure 5 is a sectional side elevation showing the invention mounted near or upon the differential casing, rather than near or upon the transmission casing, as in Figure 1;

Figure 6 is a side elevation showing the device mounted at a point intermediate the transmission and the differential, parts being in section.

Referring to Figures 1, 2, 3 and 4, the transmission casing is marked by the numeral 1 and encloses a transmission mechanism 2 capable of operating at different speeds, the transmission mechanism comprising a shaft 3, which may be called a terminal member, from which power is taken off at all speeds. Especial attention is directed to the part 3 which, although not new in itself, is of importance, because the over-running clutch (hereinafter described) is connected to it, so that the clutch may uncouple, and permit the vehicle to coast, no matter which speed may be in operation in the transmission mechanism.

The numeral 4 marks a housing which is connected at 5 to the casing 6 of the ball and socket joint 7 which connects the rearwardly extended propeller shaft 8 of the vehicle with a stub shaft 9 that is keyed at 10 to the reduced neck 11 of a cup-shaped clutch member 12 having a rim 14 provided on its edge with teeth 15. Within the rim 14 of the clutch member 12 is secured a hardened wear ring 16. Curved and wedge-shaped shoes 17 cooperate with the inner surface of the ring 16 and have longitudinal grooves 18 in which move the curved ends 19 of arms 20 projecting from the hub 21 of a clutch member that is provided with internal grooves 22 adapted to receive ribs 23 on a jack shaft 24, the ribs and the grooves connecting the hub 21 of the clutch member to the jack shaft for rotation therewith, the hub of the clutch member being connected to the jack shaft by a securing element 25 which prevents the clutch member from shifting lengthwise of the jack shaft. The jack shaft 24 has a reduced rear end 26 journaled in a bearing 27 located in the forward end of the shaft 9. The jack shaft 24 has a flattened forward end 28 received in a correspondingly shaped seat 29 fashioned in the rear end of the transmission shaft 3, the construction being such that when the transmission shaft rotates, the jack shaft 24 will rotate also. The transmission shaft 3 is journaled in an anti-friction bearing 30 located in the forward end of the housing 4, the neck 11 of the clutch member 12 being journaled in an anti-friction bearing 31 mounted in the rear end of the housing 4.

A clutch member 32 is provided and has grooves 33 which cooperate with the ribs 23 of the jack shaft 24 to connect the clutch member 32 with the jack shaft, to rotate therewith, the construction being such that the clutch member can be slid lengthwise of the jack shaft 23, to cause teeth 34 on the clutch member 32 to be engaged with or disengaged from the teeth 15 in the rim 14 of the clutch member 12. The hub of the clutch member 32 has a circumferential groove 35 in which are received the forks 36 of an arm 37 secured to a rod or slide 38 mounted to reciprocate in standards 39 on the housing 4, the slide rod having seats 40 adapted to cooperate with spring-pressed latches 41 movable in the standards 39 to hold the slide rod in any position to which it may have been moved.

The forward end of the slide rod 38 is pivoted to a link 42 operated by an arm 43 on a shaft 44, a retractile spring 45 being connected to the arm 43, the shaft 44 carrying a pedal 46 provided with a foot plate 47 having a latch 48 adapted to cooperate with a fixed keeper 49.

When the parts are arranged as shown in Figure 1, the engine of the vehicle drives the shaft 3 at different speeds, as provided by the transmission mechanism 2. The parts 28—29 cause the jack shaft 24 to rotate with the transmission shaft 3. The jack shaft 24 rotates the clutch member 21, the arms 20 of the clutch member 21 ride along the shoes 17 and press the shoes against the wear ring 16 of the clutch member 12, and the clutch member 12 is rotated. When the clutch member 12 is rotated, rotation is imparted to the stub shaft 9, because the stub shaft 9 and the neck 11 of the clutch member 12 are keyed together at 10. The shaft 9 rotates the propeller shaft 8 through the ball and socket joint 7, and from the propeller shaft 8, motion is transmitted to the rear wheels of the vehicle. When, on a down grade or elsewhere, the propeller shaft 8 turns faster than the transmission shaft 3, then motion is transmitted from the propeller shaft 8 to the clutch member 12 by way of the ball and socket joint 7, the shaft 9, and the key 10, and the rim 14 of the clutch member 12 rotates, thereby releasing the hold of the shoes 17 on the arms 20 of the clutch member 21, the rear wheels of the vehicle thus being permitted to rotate forwardly, without being coupled to the transmission shaft 3. The construction is such that the over-running clutch 21—17—14—12 operates automatically to permit the vehicle to coast when the speed of rotation of the propeller shaft 8 exceeds the speed of rotation of the transmission shaft 3. The result is a marked saving of fuel, without attention upon the part of the operator, and this saving is brought about at all speeds, because the over-running clutch, in all forms of the invention, is connected in some way to the terminal member 3 of the transmission mechanism 2, power being taken off the shaft 3 at all speeds.

In Figure 5, the propeller shaft is marked by the numeral 50 and the over-running clutch mechanism 51, of the kind hereinbefore described, is located near to the differential casing 52 in which the rear axle 53 operates.

In Figure 6, the over-running clutch mechanism 54 is interposed in the propeller shaft 55 and in the casing 56 for the said shaft, the over-running clutch mechanism 54 being disposed between the transmission casing 57 and the differential mechanism 58 wherein the rear axle 59 is located.

Reverting to Figure 1, the operator can swing the pedal 46 forwardly by means of the foot plate 47 and engage the latch 48 with the keeper 49 and the arm 43 and the link 42 carry the slide rod 38 backwardly, and the arm 37 slides the clutch member 32 backwardly so that its teeth 34 engage the teeth 15 of the clutch member 12. Then, the over-running clutch member shown in Figure 2 is rendered inoperative, because there is a direct driving connection between the transmission shaft 3 and the stub shaft 9, the aforesaid driving connection embodying the parts 29—28—24—23—33—32—34—15—14—12—10—9. In Figures 5 and 6, a rod 60 is pivoted at 61 to a member 62, corresponding to the slide rod 38, and mounted to reciprocate in the standards 63, the member 62 carrying an arm 64 which corresponds to the arm 37 of Figure 1, the operation being the same, in Figures 5 and 6, as that described hereinbefore in connection with Figure 1.

In all forms of the invention, the rotatable mechanism which connects the terminal member or shaft of the transmission with the ground wheels, embodies an over-running clutch which couples when power is being transmitted from the terminal member to the aforesaid mechanism, and uncouples when said mechanism rotates faster than the terminal member of the transmission, means under the control of an operator being provided for maintaining the clutch in coupled position.

What is claimed is:—

In a device of the class described, a housing having an opening in one end, two cooperating clutch members about which the housing fits closely, one of the clutch members being hollow and having a reduced neck journaled in the opposite end of the housing, means for moving the other of said clutch members into and out of engagement with the hollow clutch member at the will of an operator, a jack shaft including a short body of approximately the same length as the width of the interior of the housing, the shaft having reduced ends extended respectively into the neck and into the opening and of materially less diameter than the neck and the opening, said other clutch member being secured to the jack shaft for rotation therewith and for sliding movement therealong, and an overrunning clutch mechanism cooperating with the hollow clutch member and housed therewithin, one part of the overrunning clutch mechanism being connected to the shaft to rotate with the shaft.

In testimony that I claim the foregoing as my own, I have hereto affixed my signature.

JEW GARLICK.